Oct. 2, 1962

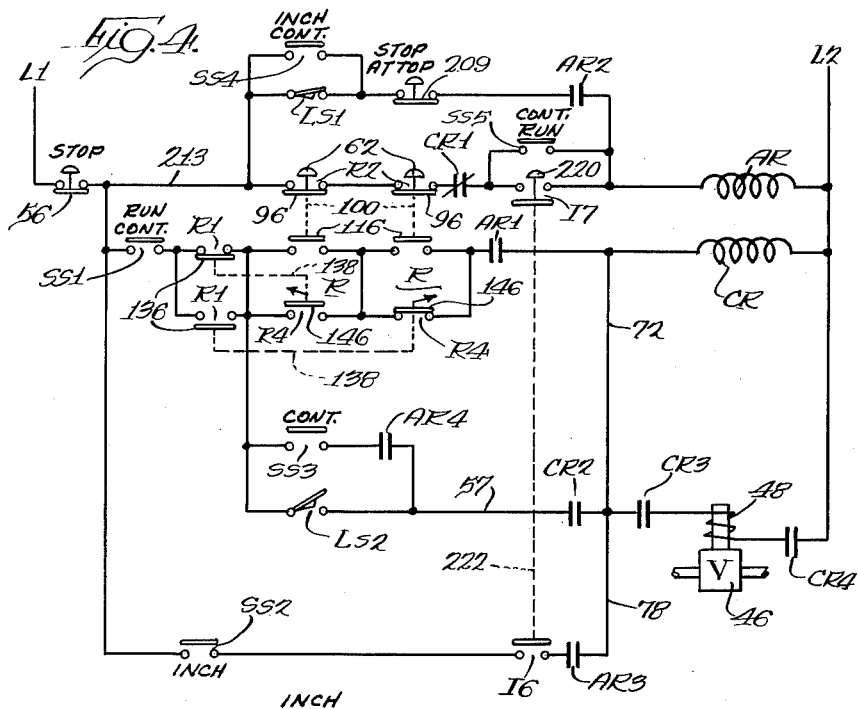

K. K. LUENSER 3,056,481

SAFETY CONTROL CIRCUIT FOR PRESSES AND RUN
BUTTON WITH SAFETY LOCKOUT THEREFOR

Filed Jan. 29, 1959

INVENTOR.
Kurt K. Luenser
BY
Wupper, Gradolph & Love
Attys.

Oct. 2, 1962 K. K. LUENSER 3,056,481
SAFETY CONTROL CIRCUIT FOR PRESSES AND RUN
BUTTON WITH SAFETY LOCKOUT THEREFOR
Filed Jan. 29, 1959 5 Sheets-Sheet 5
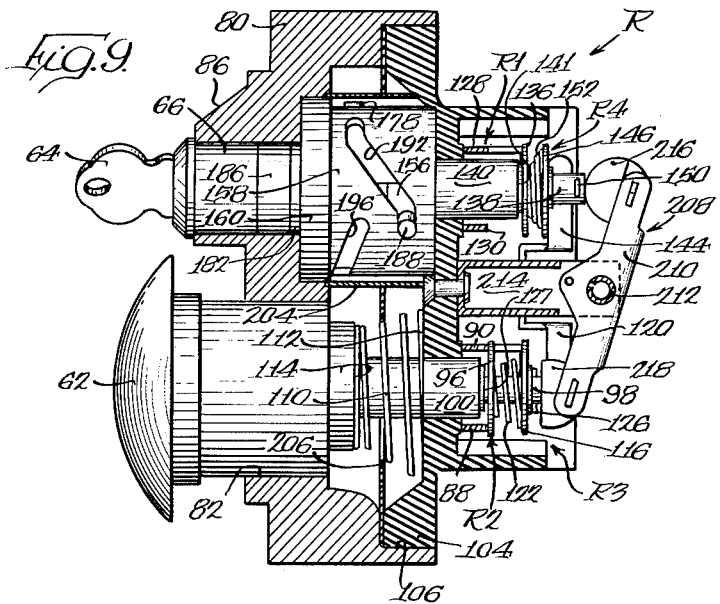
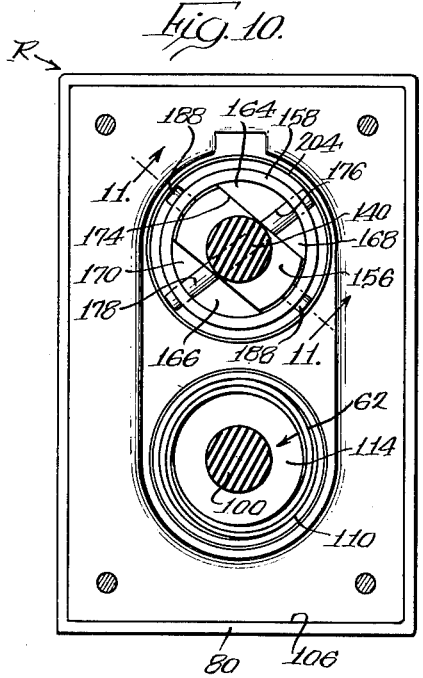
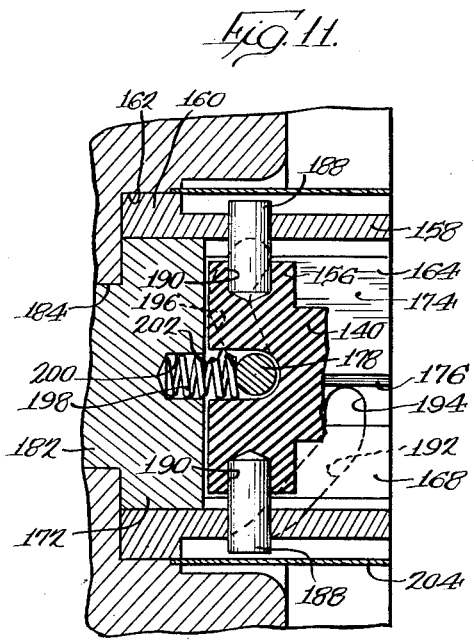
INVENTOR.
Kurt K. Luenser
BY
Wupper, Gradolph & Love
Attys.

United States Patent Office 3,056,481
Patented Oct. 2, 1962

3,056,481
SAFETY CONTROL CIRCUIT FOR PRESSES AND RUN BUTTON WITH SAFETY LOCKOUT THEREFOR
Kurt K. Luenser, Monee, Ill., assignor to Verson Allsteel Press Company, Chicago, Ill., a corporation of Delaware
Filed Jan. 29, 1959, Ser. No. 789,932
12 Claims. (Cl. 192—143)

The present invention relates to machine controls, and more particularly to a new and improved control system and incorporated circuit components and elements for metal working presses of the mechanical type having a clutch interposed between the flywheel and the eccentric drive for the press slide.

It is customary in presses of this type to construct them so that they may have a continuous operation of repeated cycles, a single cycle or "run," and an "inch" cycle where the movement of the slide is constantly under the control of the press operator.

In presses of great tonnage capacity, more than one operator may be in attendance, and it is frequently desirable for the press to be operable from any of a number of different positions around the machine, or from a station somewhat removed from the press. Safety controls have been devised which incorporate a pair of switch closing buttons to be operated simultaneously by every operator at his station when a press cycle or "run" is to be initiated. This system requires an operator at each station, and if the press be provided with five or six stations, the number of operators needed would be excessive. Consequently, manufacturers using such presses require that the control buttons be equipped with lockouts or bypasses to provide for flexibility in operating the press from any one or combination of the various stations. Unfortunately, with large presses not all of the stations are within sight of each other, and consequently some means must be provided for protecting the press operators during the operation of locking out the control buttons which are not to be used.

A system has been devised, and is in use, incorporating an antilock circuit which theoretically prevents the press from operating if all of the run or control buttons are inadvertently locked out. This circuit requires the use of extra relays and switches, and thus increases its cost over systems not so equipped. Unfortunately, this system does not always function as it is intended. If all the run buttons are locked out when the power is on and the press selector switch is in the "run" position, as distinguished from continuous operation or inching positions, the clutch might be energized momentarily during the locking out operation of the run button. Energization of the clutch might also occur if all the control buttons are locked out, the selector switch is in either of the "run" or the continuous operation positions, and the relay fails with the power on. Energization of the clutch would, of course, startle the operator and not necessarily injure him, but under some circumstances it could cause a complete press stroke, with the possible personal injury to an operator who was not visible to the person locking out the run buttons. On the other hand, if the clutch selector switch were set in the continuous operation position, the clutch would remain energized until a stop button was pressed. It is obvious, under these circumstances, that a very serious accident could occur. Thus the system which is currently in use has an inherent danger in it which should be avoided if at all possible.

It is one of the principal objects of the present invention to provide a novel press control system wherein it is possible to incorporate lockouts on each of the run buttons so that they may be moved from the use position to the bypass or lockout position at any time without any danger of the press being operated inadvertently, even though the selector switch be in the run or continuous position and the power be on.

Another object is to provide a new and improved press control system incorporating means for preventing operation of the clutch unless an operator deliberately presses the appropriate run or inch control button.

Another object is to provide a new and improved switch structure for use in control circuits wherein the switch closing contact members are manually movable, and certain circuits are broken, and other circuits are closed sequentially and not simultaneously upon the manual movement of said members.

Another object is to provide a new and improved press control system incorporating novel inching control circuits whereby the press may be operated on the inching cycle from different positions or stations, with safety to the operator, and the inching button may be placed in the use or lockout position without danger to the operator.

Another object is to provide a new and improved press control system incorporating novel inching control circuits wherein it is necessary to condition the circuit for an inching operation initially and after the circuit has been deenergized by cutting off the power.

Another object is to provide a new and improved press control circuit having improved arrangements for stopping the press slide at the top of its movement without the operator having to time his manual control of the system.

Other objects and advantages will become apparent from the following description, taken in conjunction with the accompanying drawings, wherein FIG. 1 is an elevational view, partially schematic, of a typical mechanical press showing the operating button on a panel mounted on the press frame;

FIG. 3 is a diagram of a second form of electrical operating circuit having an improved stop at top control and one form of improved inching circuit;

FIG. 4 is a diagram of a third form of electrical operating circuit having a novel inching control incorporating safety features;

FIG. 5 is a diagram of a fourth form of operating circuit having another inching control arrangement which may be operated in any of two or more stations;

FIG. 9 is a vertical cross sectional view similar to FIG. 8, showing the switch structure in the lockout or "bypass" position;

FIG. 10 is a vertical sectional view taken substantially along the line 10—10 of FIG. 8, looking in the direction of the arrows; and FIG. 11 is an enlarged fragmentary detail sectional view, taken along the line 11—11 of FIG. 10, looking in the direction of the arrows.

Figure 1:
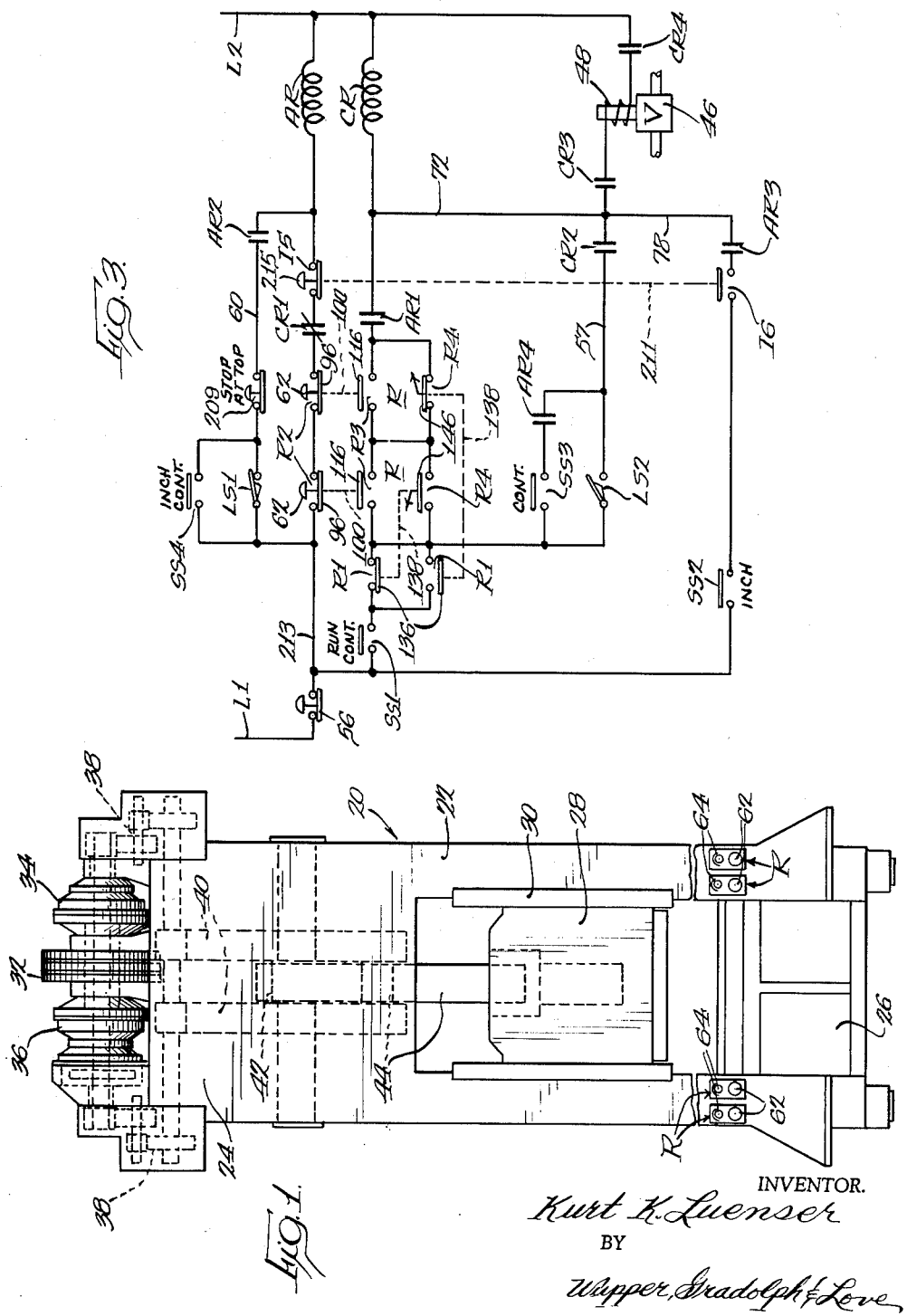

The press 20 shown in FIG. 1 may be of the type disclosed in the David C. Verson and Albert Clements Patent No. 2,286,943, with certain modifications which are dictated by the present invention.

The press 20 includes a frame 22 having a crown 24, a bed 26, and a reciprocable slide 28 movable in gibs 30. In the press crown are mounted a motor (not shown), a flywheel 32 driven by the motor and which is connected through a clutch 34, a clutch and brake assembly 36, and suitable gearing 38, to a pair of large gears 40 which drive an eccentric 42 for pitman 44 connected to the slide 28 to reciprocate the latter.

The clutch 34 and clutch brake assembly 36 are of the pressure fluid operated type (either hydraulic or pneumatic), and the supply of fluid thereto is under the control of a solenoid operated valve 46 (FIG. 2), the solenoid 48 of which is incorporated in control circuit 50 to which the present invention pertains.

Power for the control system (FIG. 2) is obtained from the lines L1 and L2 which are connected to a first section 52 of the circuit controlling the single or "run" cycle and the continuous operation cycle, and a second section 54 controlling the inching cycle. These circuits, in turn, are connected to the clutch solenoid 48, the clutch relay CR, and the anti-repeat relay AR. The solenoid 48 and the two relays CR and AR are arranged in parallel. The circuit 50 incorporates a pair of manually operated emergency stop switches 56 which are in series with the line L1 and the two circuit sections 52 and 54. These switches are normally closed, but may be opened in an emergency to stop the press operation at any instant and for any reason.

The press control includes a selector switch which has four positions, namely, off, continuous cycling, run or single cycle operation, and inching operation. This selector switch is conventional and it is not shown in physical detail in the drawings, but certain contacts from it are shown and indicated as follows: SS1 is a switch in series with the stop switches 56 and controls the energization and use of the circuit section 52; SS2 is in parallel with SS1 and in series with the stop switches 56 and the inching circuit section 54, and controls the operation of the latter; SS3 is in a holding circuit 57 and is closed when it is desired to operate the press on continuous or repeated cycles.

The clutch relay CR is in series with a normally open switch AR1 which is closed upon energization of the anti-repeat relay AR. The relay AR is energized immediately upon closing of the selector switch SS1 through a circuit which includes any one of parallel connected switches R1 which are connected to a conductor 58, and a series of normally closed switches R2, and a normally closed switch CR1 which is opened upon energization of the clutch relay CR. In the specific example shown, there are four switches R1 arranged in parallel between the selector switch SS1 and the conductor 58, and there are four switches R2 which are connected in series between the conductor 58 and the normally closed switch CR1. In order that the operation of the press continue after being initiated with the relay AR remaining energized after opening a switch R2 and the switch CR1, a holding circuit 60 is provided and includes a normally open switch AR2 and a position limit switch LS1. The holding circuit 60 is in parallel with the switches R2 and CR1 so that when the clutch is energized and the switch CR1 opens, the holding circuit will remain closed and therefore the anti-repeat relay AR will remain energized until the position limit switch LS1 is opened. The opening of the limit switch LS1 to deenergize the anti-repeat relay AR is a function of the control system on "run" cycles to prevent another cycle without pressing the appropriate control button. The timing of the switch LS1 may vary, but it is usually set to open at approximately 270° operation of the eccentric, at which time the press slide will have been returned about half way toward its top or normal stop position in the press stroke.

Figure 2:
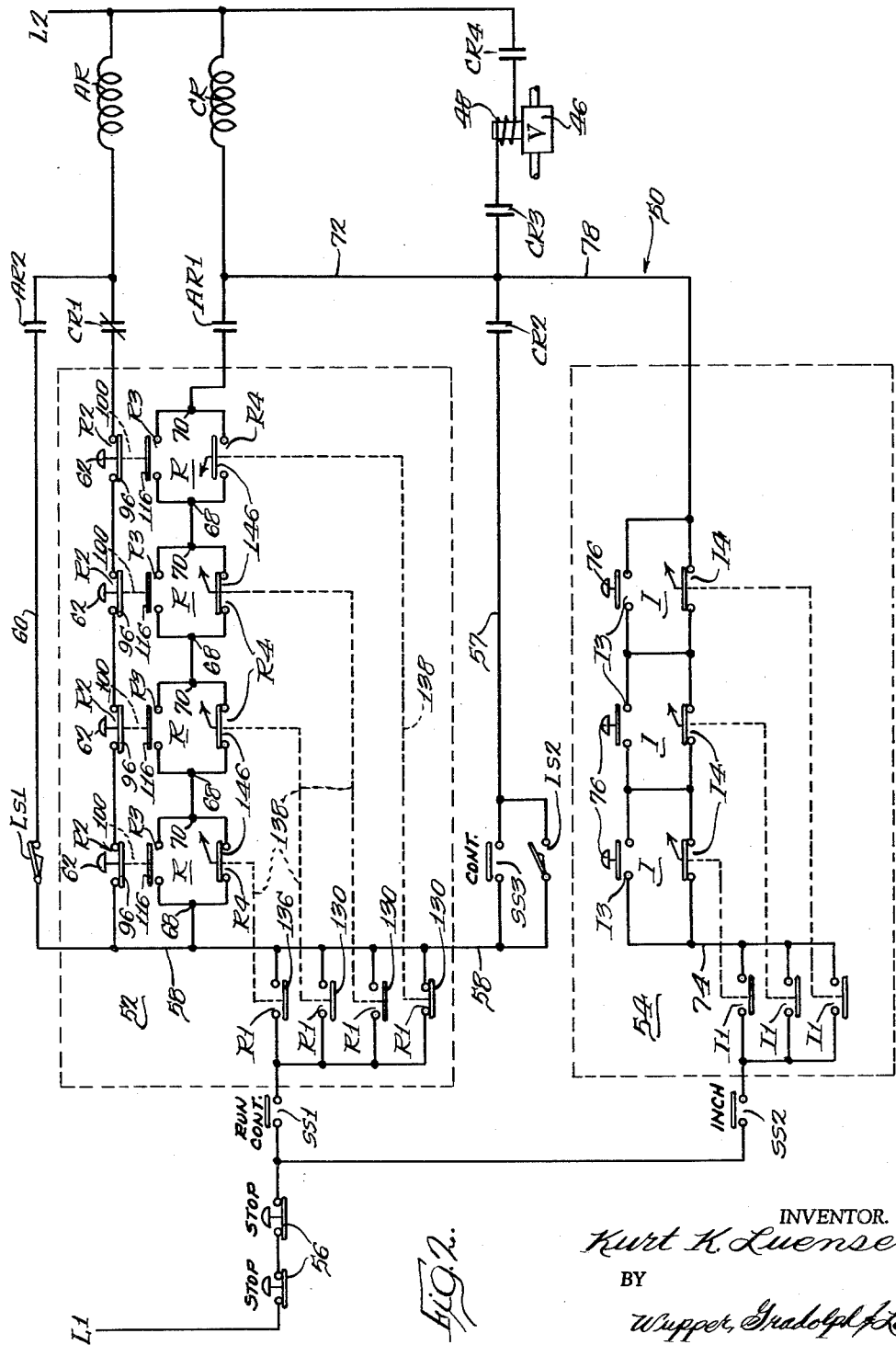
FIG. 2 is a diagram of the electrical operating circuit incorporating the safety features of the present invention.
Figure 6:
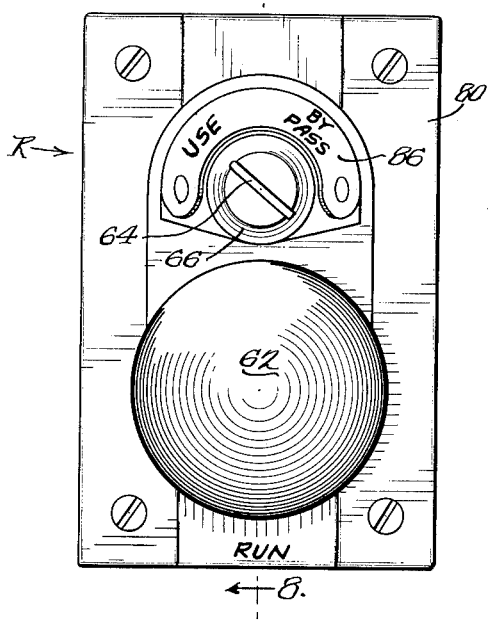
FIG. 6 is an enlarged elevational view of the run button panel, with the control button and key control mounted thereon.
Figure 7:
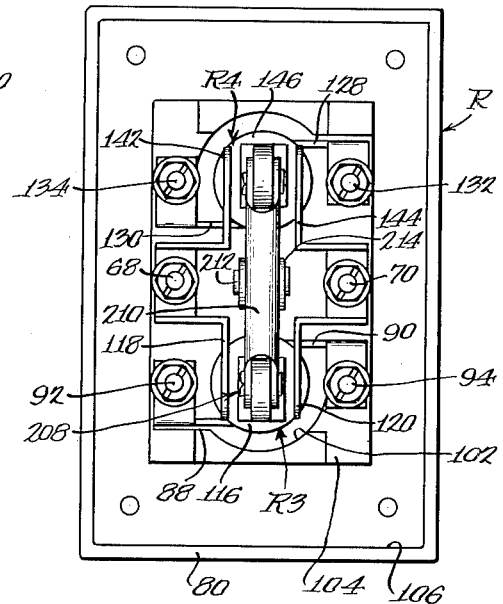
FIG. 7 is a rear view of the run button and control assembly of FIG. 6.

Each run button switch assembly, indicated in general by the reference character R, and shown in structural form in FIGS. 6 to 11, includes, in addition to the switches R1 and R2, switches R3 and R4. As seen in FIG. 2, the switches R3 and R4 are arranged in parallel sets, with all the parallel sets being connected in series between the conductor 58 and the switch AR1. The switches R2 and R3 are mechanically interconnected and are manually operated by a push button 62 in such fashion that when the button 62 is depressed the switch R2 opens before the switch R3 closes. The switches R1 and R4 are interconnected and are operated by a key 64 through a conventional tumbler 66 and are so arranged that when the key is turned from the "use" to the "bypass" position (FIG. 6), the switch R1 opens before the switch R4 closes, and when the key 64 is turned from the "bypass" to the "use" position the switch R4 opens before the switch R1 closes. How this is accomplished will be apparent from the description of switch structure illustrated in FIGS. 6 through 11. It will be noted that one terminal of each of switches R3 and R4 is connected to a binding post 68, while the other terminal of each of the switches R3 and R4 is connected to a binding post 70, and that the binding posts 68 and 70 are connected in series with each other and the conductors 58 and the switch AR1.

The control system with the switch assemblies R in the positions shown in FIG. 2 contemplates operation of the press from a single station, it being observed that three of the four switches R4 are in the bypass position, that is, closed, with the corresponding switches R1 open; and the fourth switch is in the use position, or open, and the corresponding switch R1 is closed. With the selector switch in the run position, the switch SS1 is closed and a circuit is established through the switch SS1, the closed switch R1, through the series of normally closed switches R2 and the normally closed switch CR1, and the anti-repeat relay AR to energize the latter. Energization of this relay closes the switches AR1 and AR2, the latter energizing the holding circuit 60 for the anti-repeat relay AR, and the former conditioning the circuit to the clutch relay CR for energization of the latter.

The press cycle is initiated by closing the switch R3 which is associated with the open stitch R4, and an instant before this is done the switch R2, corresponding thereto, is opened (the switches R2 and R3 being mechanically interconnected) and a circuit is established from the switch SS1 through the closed switch R1, the conductor 58, the three closed switches R4, the single closed switch R3, the closed switch AR1, and the clutch relay CR. Energization of the relay CR opens the switch CR1 in series with the anti-repeat relay AR, but that relay will not be deenergized since the holding circuit switch AR2 will have previously been closed. Energization of the clutch relay CR closes the three clutch relay switches CR2, CR3, and CR4. These switches are in series with each other and with the clutch solenoid 48, the conductor 58, the switch SS3, and a cam operated switch LS2. The cam switch LS2 and the selector switch SS3 are connected in parallel. The cam switch LS2 closes upon movement of the slide 28 in the downward direction, and remains closed until the slide is restored to its uppermost position. The selector switch SS3 is closed only when the press is set to run on continuous or repeated cycles, and consequently it is open when the master selector switch is set in the "run" position and has no effect upon run or single cycle operation. In order that the clutch relay CR be maintained in energized condition and the press operated through the full cycle and with full safety, a conductor 72 interconnects the circuit between the clutch relay CR and the switch AR1, with the circuit connection between the switches CR2 and CR3. Thus, when the clutch relay is energized, the switches CR2, CR3, and CR4 will close, and will remain closed until the cam switch LS2 is opened, the circuit energizing the clutch relay, during this time, being the line L1, stop switches 56, switch SS1, closed switch R1, conductor 58, limit switch LS2, switch CR2, conductor 72, and clutch relay CR to the line L2. The clutch solenoid is energized by the same circuit, except that it includes the switches CR3 and CR4 and the solenoid 48, the latter all being in parallel with the clutch relay CR.

As the slide returns to its top position, the switch LS2 opens, and the circuit to the switches CR2, CR3, and CR4 is opened. Since the switch R3 was closed only momentarily in order to start the press cycle and should not be held closed manually by the operator, the circuit to the anti-repeat relay AR will open when the slide is half way restored to its top position upon opening of the position limit switch LS1. However, the limit switch LS1 recloses shortly before the slide 28 reaches its top position. If the operable run buttons 62 were released the relay AR will be energized, as previously described. Should the run buttons 62 remain depressed, the switches R2 associated therewith will remain open and the relay AR will not energize, thus showing its anti-repeat function. The press cannot recycle until all the buttons 62 are released. Therefore, when the slide returns to its uppermost position with all the buttons 62 released, the circuit will be conditioned for another cycle which can be started by depressing momentarily the appropriate button 62.

In view of the fact that when the switch assembly R is moved from the use to the bypass or lockout position, the switch R1 opens before the switch R4 closes, there can be no possibility that all four switches R4 will be closed at a time when any one of the switches R1 is also closed. Thus, it will be impossible for the press to be inadvertently operated during a change of the run button controls R from use to bypass condition, and vice versa. Furthermore, it will be noted that it is impossible to operate the press at any time when all four of the controls R are in bypass position, because all of the switches R1 will be open and the circuit section 52 connected to the conductor 58 through the selector switch SS1 cannot be energized. This invention, therefore, provides a safety system which is as foolproof as can be devised, and yet permits extreme flexibility in operating the press solely from any one or combination of the control assemblies R.

The inching control circuit section 54, which is arranged in parallel with the run and continuous operation circuit section 52, includes the selector switch SS2 which is connected in series with a plurality of parallel switches I1 and a conductor 74, the conductor 74 being comparable to the conductor 58. The inching buttons and switch assemblies I each have three sets of switches. In addition to the switch I1, each is provided with a switch I4 which is similar to the switch R4 and has a similar function, and a switch I3 which is similar to switch R3 of the assembly R.

In FIG. 2 all of the inching switch assemblies I are shown in the bypass position, which is the position they may occupy when the press is being operated for continuous or run cycling, although this is not essential with the switch SS2 open during such operations. If it is desired that the inching operation be carried out, the selector control is moved to the inch position to close switch SS2 and open switches SS1 and SS3. One of the switch assemblies I will be moved from the bypass to the use position, in which case the switch I4 will open before the corresponding switch I1 closes. Then the press may be "inched" by depressing the button 76 for the switch assembly I which is in the use position. This closes the switch I3 in parallel with open switch I4 and which remains closed only as long as the button 76 is held depressed. A circuit is established from the line L1 and stop switches 56 through the selector switch SS2, a closed switch I1, conductor 74, a pair of switches I4, a manually closed switch I3, conductors 78 and 72, and clutch relay CR to the line L2. Energization of the clutch relay CR closes switches CR3 and CR4 to energize the solenoid 48. It will also close the switch CR2, but this is incidental, since the remainder of the circuit 57 is open (switch SS1 being open). The switches CR3 and CR4 will remain closed only as long as the switch I3, which corresponds to the open switch I4, is manually held closed by depressing the button 76. The movement of the slide 28 is thus under full and sole control of the operator.

It will be observed that it is impossible that the inching circuit 54 be inadvertently energized even if all the switches I4 are closed and the selector switch SS2 is closed with the power on since all of the switches I1 will be open. Closing one of the switches I1 will, immediately prior thereto, open the corresponding switch I4, and consequently it will be necessary manually to close the corresponding switch I3 before the clutch relay CR and the clutch solenoid 48 can be energized to operate the press. It will be appreciated, therefore, that the safety features of this circuit are complete.

Should it be desired to operate the press on continuous or repeated cycling, the master selector switch is moved to the continuous operation position in which the selector switches SS1 and SS3 are closed and the selector switch SS2 is open. At least one switch assembly R is set in the use position and those not set in the run position will be locked out or bypassed. The anti-repeat relay AR is energized as previously described to condition the circuit to the clutch relay CR for energization. The run buttons 62 set in use position are depressed to energize the circuit to the clutch relay which then closes the switches CR1, CR2, and CR3. The press will operate on repeated cycles since the relay CR will remain energized (even though the anti-repeat relay and its holding circuit will be deenergized) through the following circuit: line L1, stop switches 56, selector switch SS1, closed switch R1, conductor 58, selector switch SS3, switch CR2, conductor 72, and relay CR to the line L2. The clutch solenoid 48 will also remain energized since the energized clutch relay CR holds the switches CR2 and CR3 closed. This operation may be terminated by opening one of the switches 56 or by moving the master selector control to the off position.

The switch assembly R is shown in physical detail in FIGS. 6 through 11. The assembly is mounted on a base or frame 80 which may be made of any suitable material, particularly one that can withstand machine shop usage. In the frame are mounted the push button 62 which is slidably positioned in a bore 82, and the lock tumbler 66 which is rotatably mounted in a bore 84. Adjacent the lock and on a beveled surface 86 are indicated the two positions of the tumbler 66, as for example, the "use" and the "bypass" positions. Consequently, the press operator, by looking at the run button assembly R, can tell whether any particular button is that which may be used for operating the press, or if it is locked out or bypassed. If it is in the use position shown in FIG. 6, then depressing the button 62 will energize the press, provided all of the remaining switch assemblies R are in the bypass position or are similarly manually actuated. If, however, the switch tumbler 66 indicates that this switch is in bypass position, then it cannot be used for operation of the press. From a safety standpoint it is advisable that the key 64 be completely removable from the tumbler 66 and entrusted to a supervisory employee so that it is his decision and judgment for the switch assembly R to be put into the use condition or into the bypass condition, respectively.

The switch R2 includes a pair of contact blades 88 and 90 connected respectively to binding posts or terminals 92 and 94. The switch R2 is normally closed by a movable circular contact member 96 which has a central opening and is slidably carried upon the reduced outer end 98 of a switch operator member 100. The operator member 100 is fixed in the push button 62 and is movable thereby. The contact blades 88 and 90 are mounted in a recess 102 in an insulating mounting block 104 which is fixed to the base or frame 80 in a rectangular recess 106 formed therein. The actuator member 100 projects through an opening 108 in the mounting block 104 from the recess 106 and into the recess 102.

The push button 62 is urged in the outward direction by a spring 110 surrounding the member 100 and which acts between an inner face 112 of the mounting block 104 and a shoulder 114 on the push button 62.

The reduced extension 98 of the operator 100 carries a second movable circular contacting member 116 which is adapted to bridge between a pair of contact blades 118 and 120 which are connected respectively to the terminals 68 and 70 and constitute the run button switch R3. In the normal position of the run button 62 the contacting or bridging member 116 is separated and spaced from the contacts 118 and 120, and thus the circuit in which these contacts are connected is normally open. A spring 122 is carried by the extension 98 between the contacting members 96 and 116 and urges them apart, being retained on the extension 98 by a washer 124 and a cotter pin 126.

It will be noted that the maximum distance that the contacting members 96 and 116 may be spaced apart on the operator extension 98 is less than the distance between the pair of contacts 88 and 90 and the pair of contacts 118 and 120. Thus, when the push button 62 is depressed, a shoulder 127 on the operator 100 moves the switch member 96 away from the contact blades 88 and 90 to open the switch R2. This occurs before the switch member 116 comes against and bridges across the contacts 118 and 120 to close the switch R3. Thus, the circuit containing the switch R2 is broken before the circuit containing the switch R3 is completed.

The switch R1 includes a pair of contacts 128 and 130 connected, respectively, to binding posts 132 and 134 which are carried in the mounting block 104. A circuit between the contacts 128 and 130 is closed when the switch structure R is in the use position, by a circular bridging or contacting member 136 carried on the extension 138 of an operator 140. It will be noted that the operator 140 is larger than the extension 138 to form a shoulder 141 therebetween which contacts the bridging switch member 136 and lifts it clear of the contacts 128, 130 when the switch R1 is to be opened.

The switch R4 includes contact blades 142 and 144 connected respectively to the terminals or binding posts 68 and 70 carried in the insulating block 104. The circuit including these contacts is normally open when the switch structure R is in the "use" position, and normally closed when the switch structure R is in the "bypass" or lockout position. The switch R4 includes a contacting member 146 of circular shape carried adjacent the outer end of the operator extension 138 and is prevented from sdiling thereoff by a washer 148 and a cotter pin 150. The switch contactors 136 and 146 are urged apart by a spring 152 encircling the extension 138, and the maximum distance the contactors may be separated is less than the spacing distance between the pair of contact blades 128 and 130 and the pair of contact blades 142 and 144. Consequently, it is impossible for the switch R4 to be closed before the switch R1 has been opened, and vice versa.

At its inner end the operator 140 is integral with a slide block 156 (FIGS. 10 and 11) which is enclosed within a sleeve 158. The inner end of the sleeve 158 has a boss 160 thereon which is press fitted into a cylindrical recess 162 in the base 80.

The slide block 156 is guided for reciprocation axially of the sleeve 158 by a group of cage forming fingers 164, 166, 168, and 170, which are fixed to or are integral with a hub or base member 172 which is rotatably mounted in the base of the sleeve 158. The inner faces of the four guide fingers form a relatively wide slideway or guideway 174 for the slide block 156 and a second and narrower guideway 176 for a locking pin 178. The hub 172 has an extension 182 which projects into an opening 184 in the base 80. The extension 182 has a tongue and groove driving connection 186 with the tumbler 66 used for locking out the switch assembly R.

The tongue and groove drive between the lock tumbler 66 and the hub 172 provides a rotational drive for the cage fingers 164, 166, 168, 170, to rotate them and through them the slide block 156. As the slide block is rotated, it is moved inwardly and outwardly of the sleeve 158 by a pair of pins 188 which have their inner ends fitted into holes 190 in the opposite ends of the slide block, and their outer ends projecting into cam slots 192 formed in the cylindrical wall of the sleeve 158. When the pins are at the end of the cam slot closest to the sleeve boss 160, the slide block 156 and the switch operator 140 are retracted, and the switch assembly R is in the use position. When the pins 188 are at the opposite and outer ends of the slots 192 then the slide block 156 is advanced and the switch operator 140 is projected to close the switch R4 and to open the switch R1, and the switch structure R is in the lockout or bypass position. It will be noted that at their opposite ends the cam slots 192 are formed with short flat or straight sections 194 which permit a slight lost motion before the pins 188 move the slide block 156 either inwardly or outwardly of the sleeve.

The slide block 156 is locked in either its retracted or projected position by the pin 178 which extends across the sleeve and has its opposite ends projecting into V-shaped locking slots 196, and the apices of the V's form the over dead center position. The pin 178 is urged outwardly of the sleeve 156 by a spring 198 confined between the pin 178 and a recess 200 formed in the cage hub 172. When the key is turned to operate the slide block and move it outwardly, the slight straight or circumferential sections 194 of the slot 192 give the assembly a chance to pull the locking pin 178 leftwardly as seen in FIG. 11, and therefore out of a slot 202 formed in the base of the slide block and into which it fits when the slide block is completely retracted (FIG. 11). The locking pin 178 prevents the assembly controlling the position of the contacting members 136 and 146 for the switches R1 and R4 to be inadvertently moved from either the "use" or the "bypass" positions. This provides an additional safety feature for the switch structure R to insure the proper operation of the control system.

The assembly for the switch operator 140 as it extends through the base 80 is insulated therefrom by a sleeve of insulating material 204 which is also press fitted into the bore 162 in the base 80. Furthermore, the mounting block 104 is likewise insulated from the base 80 even though the former is made of an insulating material, by a sheet of insulating material 206, which is provided with suitable apertures for the sleeves 158 and 204, the operator 100, the spring 110, and the inner end of the push button 62.

Figure 8:
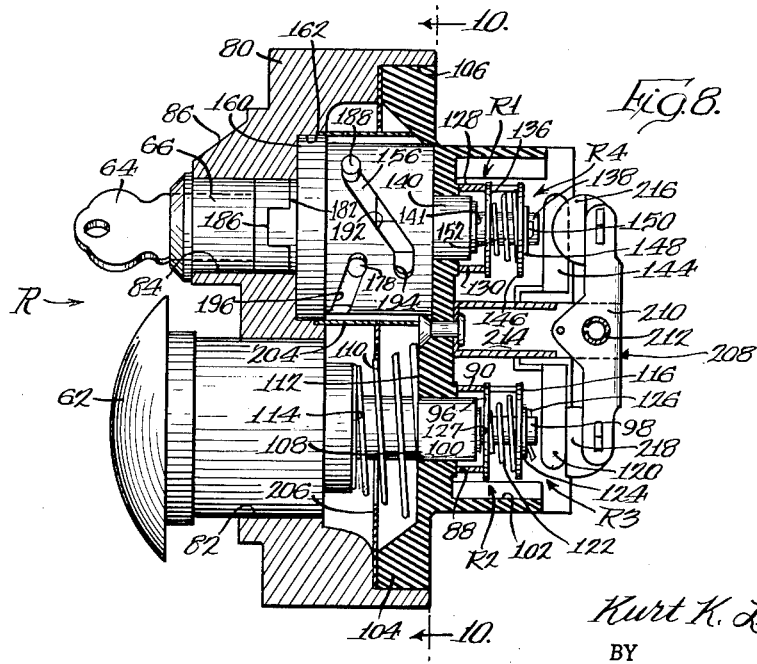
FIG. 8 is a vertical cross sectional view, taken along the line 8—8 of FIG. 6, looking in the direction of the arrows, and showing the switch structure in the "use" position.

It is desirable, when the key operated mechanism controlling the position of the switches R1 and R4 is in the bypass position as shown in FIG. 9, that it be impossible for the push button 62 to be depressed to open the switch R2 and close the switch R3, and an interlock 208 is provided to prevent such operation. This interlock comprises a lever or bar 210 pivotally mounted at 212 on the outer end of a post 214, which is carried by the insulating block 104 between the switch assemblies R1, R4, and R2, R3. At its upper end, as viewed in FIGS. 7, 8, and 9, the lever or bar 210 carries a roller 216 which is adapted to be contacted by the outer end of the operator extension 138. At its opposite end the lever or arm 210 carries an engaging shoe 218 which has a flat surface which is adapted to be contacted by the outer end of the operator extension 98. In its extreme positions the lever 210 is shown in its neutral or "use" position, whereein it is possible for the run button 62 to be depressed (FIG. 8). In this position, when the run button 62 is depressed, the switch R2 opens and switch R3 closes, and the outer end of the operator extension 98 may come into contact with the shoe 218. This is unimportant, since it will merely rotate the lever 210 slightly in the counterclockwise direction, but it will in no way interfere with the operation of the switching mechanism or the full depressing of the run button 62. However, when the switch mechanism R is set in the "bypass" position (FIG. 9), and the switch operator 140 and its extension 138 are moved to their outer positions, the lever 210 is rocked about the pivot as far as it will go, contacting and holding the switch operator 100 and its extension 98, and thereby preventing operation of the run button 62. This will prevent opening of the switch R2 and closing of the switch R3, which would be undesirable when the switch mechanism R is in the bypass position. The lever 210 is provided so that should an operator not notice that the switch unit R is in the bypass position, the lever will prevent him from depressing the button 62 and this will call his attention to the fact that the unit is bypassed. If the interlock lever 210 were not provided, an operator might not realize that the particular unit or assembly R was not required to stroke or run the press, thus giving the operator a false sense of security. This feature is very important where there is more than one operator attending the press and provides another safeguard for the operators.

From the foregoing description of the construction and operation of the control circuit and system, and the safety run button switch R, as particularly illustrated in FIGS. 6 to 11, it is deemed that the operation of the system is clear and that it is unnecessary that it be repeated in detail.

It is obvious that the safety features which are incorporated in the press and system are sufficient to prevent any operator from becoming injured as a result of carelessness in changing the press circuitry from run operation to bypass operation, even though all of the stations having run buttons be moved to the lockout or bypass condition at one time.

In FIG. 3, there is diagrammatically shown a circuit having a novel stop at the top control arrangement, and an improved inching control circuit.

In this figure, those reference characters which identify the similar circuit components shown in FIG. 2, are used to identify comparable components. Herein the holding circuit 60 for the anti-repeat relay AR is provided with a bypass circuit for the position limit switch LS1 having a selector switch SS4 which is closed when the circuit is to be used for a continuous run operation or an inching operation. Thus, the position limit switch which would normally open when the slide is approximately half way to its top position is rendered impotent to affect the circuit when the switch SS4 is closed, as it would be during continuous or inch cycling.

The holding circuit 60 is provided with a manually operated stop at the top switch 209 connected in series with the parallel arranged switches LS1 and SS4 and the normally open switch AR2, and also in series with the anti-repeat relay AR. This circuit is also provided with an improved inching control which includes a normally closed inching switch I5 which is mechanically connected to a normally open inching switch I6 by a linkage 211. The normally closed switch I5 is in series with the switches R2 and CR1, while the normally open switch I6 is in series with the selector switch SS2 and a normally open anti-repeat relay switch AR3.

In this system when the selector switch is moved to the continuous operation position, the switch SS4 will be closed, thereby eliminating the control of the position limit switch LS1. Under normal operation, when the press is running if the switch 209 (which is in the holding circuit 60) is manually opened, the holding circuit to the relay AR will be broken to deenergize the relay. This will permit the switch AR1 to open, thereby breaking one of the circuits to the clutch relay even though one of the run buttons 62 is held depressed. It will also open switch AR4 in the bypass or holding circuit including the closed selector switch SS3, thus placing the clutch relay under control of the position limit switch LS2 which will open when the slide 28 reaches the top of its movement. The anti-repeat relay will remain deenergized, thereby functioning to prevent another cycle. When the limit switch LS2 opens, the circuits including the clutch relay CR, the switch CR2, CR3, and CR4, and the clutch solenoid 48, will be broken to deenergize the relay and the solenoid. This cuts off the flow of actuating fluid to the press clutches 34 and 36, terminating operation of the press at the top of the slide movement.

A press equipped with a circuit of FIG. 3, also has an improved safety inching operation. In this circuit the switch I5 is connected in series with the switches R2 and CR1. The switch I6 is connected in series with the selector switch SS2 and an anti-repeat switch AR3. With the selector switch in inching position and the power on, the anti-repeat relay AR will be energized from the line L1 to the line L2 through a circuit including the emergency stop switch 56, bypassing conductor 213 (around switch SS1), relay switches R2, the closed switch CR1, inching push button switch I5, and the relay AR. Energization of the relay closes the switches AR2 and AR3 and the holding circuit 60 for the anti-repeat relay AR is energized. The circuit is thus conditioned for inching the slide 28.

To inch the slide 28, the button 215, controlling the switches I5 and I6 is depressed and held depressed for only as long as it is desired that the slide move. This operation closes the switch I6 and, just prior thereto, opens switch I5. The clutch relay CR will then be energized in the following circuit: line L1, emergency stop switch 56, selector switch SS2, inching switch I6, switch AR3 (which has been closed by the anti-repeat relay AR), conductors 78 and 72, clutch relay CR, and line L2. This, of course, closes the circuit to the clutch solenoid 48 through the closed clutch relay switches CR3 and CR4. Inching of the slide stops when the button is released automatically to open the switch I6, thereby breaking the circuits to the clutch relay CR and the clutch solenoid 48.

The stop at the top switch 209 is normally closed and is only momentarily opened when used, and therefore when the system of FIG. 3 is used for inching operation, that switch is closed and plays no part in the operation of the press. The anti-repeat relay AR remains closed during the inching operation through the holding circuit 60 unless the stop switch 56 or a similarly connected limit switch is opened. However, when the inching button 215 is released the switch I6 automatically opens and the switch I5 automatically closes, thus conditioning the circuit to the relay AR for energization when the stop switch 56 or limit switch closes.

In conventional inching controls the slide moves as long as the inch button (which is, of course, true of the control of this invention) is depressed. It is quite customary for a press to be inched more or less continuously for several days when the press is new and also while the press tooling, dies, and the like, are being proved. Should a limit switch open or an operator open a stop button, the press will stop even though the inch button be held down. Release of the stop button, or closing of the limit switch, will immediately restore press operation. If the operator who opened the stop switch was not the operator controlling the inching, an obviously dangerous situation exists. With the circuit of FIG. 3, the inching operator is required to release the inch button 215 to reenergize the relay AR to condition the inching circuit for operation. This provides safety over the conventional arrangements. Further improved safety controls are diagramed in the circuits of FIGS. 4 and 5.

In the circuit of FIG. 4, the arrangement of the run buttons and continuous operation circuitry are essentially the same as that shown in FIG. 3. However, the inching circuit is provided with additional safety features. An inching button and switch operator 220 is provided which controls a normally open inching switch 17 in series with the normally closed switches R2 and CR1. It is connected in parallel with a bypass circuit including a selector switch SS5 which is open during inching operation, but would be closed when it is desired to operate the press on continuous or repeated cycles, or run or single cycle methods.

In order to energize the system for an inching action, it is necessary first to pull the button 220 to close the switch I7 thus to energize the anti-repeat relay AR, and to close the holding circuit 60 for the anti-repeat relay through the selector switch SS4, stop at the top switch 209, and the switch AR2. This will condition the inching circuit for operation by closing the switch AR3. Thereafter the button 220 will be pressed, opening the switch I7 which will not affect energization of the anti-repeat relay AR, and closing the switch I6, mechanically connected to the switch I7 at 222, thereby closing the circuit to the clutch relay CR as follows: line L1, emergency stop switch 56, selector switch SS2, inching switch I6, switch AR3, conductors 78 and 72, clutch relay CR, and line L2. The clutch relay switches CR3 and CR4 will close, and the solenoid 48 will be energized to operate the clutches 34 and 36. When the button 220 is released, the connector 222 permits the switch I6 to open, but the switch I7 will not close. Successive inch movements of the slide 28 may be made by depressing the button 220 as the relay AR will remain energized until the power is cut off. When this happens the circuit must be conditioned for subsequent inching operations by pulling the button 220 to close the switch I7 and thereby energize the circuit to the anti-repeat relay. Thus, it is impossible unintentionally to operate the inching circuit after a power shutoff without previously conditioning it for operation by pulling the operating button 220.

The control circuit of FIG. 5 is similar to that of FIG. 4, except that it provides for inching the press from any one of a plurality of stations which are provided with safety lockouts. In this case, master inching switch assemblies I are provided with the individual inching switches I7, a pair of which is shown connected in parallel with the selector switch SS5 but in series with the run button switches R2 and the switch CR1 as well as the anti-repeat relay AR. These switches are normally open and in order to condition the press circuit for inching operation, one of the buttons 220 must be pulled to energize the circuit to the anti-repeat relay AR. Thereafter the button is pushed to close the respective switch I6 for controlling the inching operation through the selector switch SS2, switch AR3, conductors 78 and 72, clutch relay CR, and thereafter, through the clutch relay switches CR3 and CR4 and solenoid 48. In this system, however, the inching master switch controls I are provided with use and bypass controls similar to those diagramed in FIG. 2, and thus are provided with switches I8 which are in parallel with the switches I6 and with the parallel connected switches I9 which are mechanically connected to the switches I8. These function in exactly the same manner as the switches I1 and I4 in the system of FIG. 2. When one of the inching buttons 220 is to be used, the remaining inching controls are moved to the bypass position, thereby closing the respective switches I8 which are in series with the selector switch SS2 and a closed switch I9. Thereafter, the circuit for the clutch relay CR will be from the line L1, stop switch 56, selector switch SS2, a closed switch I9, a closed bypass switch I8, a manually closed inching switch I6, the closed anti-repeat relay switch AR3, conductors 78 and 72, and clutch relay CR, to the line L2, thus to energize the circuit to the clutch solenoid 48.

From the foregoing description, it will be apparent that the circuits and mechanisms therein provided accord the operator maximum safety. It is manifestly impossible for the press to be inadvertently operated even during such times as the run or inching switch assemblies R and I are being changed from their "use" positions to their "bypass" positions, and vice versa. It is submitted, therefore, that the objectives which were claimed for this invention at the outset of this specification have been fully attained by the controls, circuits, and mechanisms herein illustrated and described.

While there have been shown and described preferred embodiments of the present invention, it will be apparent that further numerous variations and modifications thereof may be made without departing from the underlying principles of the invention. Therefore it is desired, by the following claims, to include within the scope of the invention all such variations and modifications by which substantially the results of this invention may be obtained from the use of substantially the same or equivalent means.

What is claimed as new and useful, and desired to be secured by United States Letters Patent is:

1. A control for a press having a clutch and electrically operated means for controlling the clutch operation and adapted to be connected to a source of electric power, comprising in combination, normally open switch means controlling the supply of current to the electrically operated clutch controlling means, a clutch relay connected to close said switch means when energized, a circuit connected between said clutch relay and the source of electric power and including a plurality of series connected pairs of switches with each member of the pair being connected in parallel with the other member, the first switch in each pair being normally open and manually closable and the second switch in each pair being selectively positioned in either open or closed position, a third switch for each pair of switches connected in series in said circuit and linked to said second switch and moved to open position as but shortly before said second switch is closed and moved to closed position as but shortly after said second switch is opened, and means in said circuit for preventing energization of said clutch relay upon conclusion of a single press cycle.

2. A control for a press having a clutch and electrically operated means for controlling the clutch operation and adapted to be connected to a source of electric power comprising in combination, normally open switch means controlling the supply of current to the electrically operated clutch controlling means, a clutch relay connected to close said switch means when energized, a circuit connected between said clutch relay and the source of electric power and including a plurality of pairs of switches with each member of the pair being connected in parallel with the other member, the first switch in each pair being normally open and manually closable and the second switch in each pair being selectively positioned in either open or closed position, a third switch for each pair of switches connected in series in said circuit and linked to said second switch and moved to open position as but shortly before said second switch is closed and moved to closed position as but shortly after said second switch is opened, means in said circuit for preventing energization of said clutch relay upon conclusion of a single press cycle, electric means controlling operation of said last named means, and a second circuit including a set of normally closed manually operable fourth switches linked to said first switches of each pair and connected to control the supply of current to said electric means, each of said fourth switches when moved to open position closing the corresponding first switch and opening the second circuit to said electric means.

3. A control as claimed in claim 2, including a holding circuit for said electric means, said holding circuit including means to prevent deenergization of said electric means when the press is to be operated on repeated cycles.

4. A control as claimed in claim 2, including a holding circuit for said electric means, said holding circuit including means to prevent deenergization of said electric means when the press is to be operated on repeated cycles, and manually operable switch means in said holding circuit to break said holding circuit and stop the press at the end of a cycle when the press is operating on repeated cycles.

5. A control for a press having a clutch and electrically operated means for controlling the clutch operation and adapted to be connected to a source of electric power, comprising in combination, open switch means controlling the supply of current to the electrically operated clutch controlling means, a clutch relay connected to close said switch means when energized, a circuit connected between said clutch relay and the source of electric power and including a plurality of series connected pairs of switches with each member of the pair being connected in parallel with the other member, the first switch in each pair being normally open and manually closable and the second switch in each pair being selectively positioned in either open or closed position, a third switch for each pair of switches connected in series in said circuit and linked to said second switch and moved to open position as but shortly before said second switch is closed and moved to closed position as but shortly after said second switch is opened, a normally open anti-repeat switch in said circuit in series with said clutch relay and said pairs of switches, an anti-repeat relay connected to close said anti-repeat switch when energized, and a second circuit including a set of normally closed manually operable fourth switches linked to said first switches of each pair and connected in series with each other with said anti-repeat relay and with said source of power, each of said fourth switches when moved to open position closing the corresponding first switch, thereby to break the manually controlled circuit to the anti-repeat relay and to close the circuit to the clutch relay.

6. A control for a press having a clutch and electrically operated means for controlling the clutch operation and adapted to be connected to a source of electric power, comprising in combination, a clutch controlling solenoid, normally open switch means connected in series with said solenoid, a clutch relay connected to close said switch means when energized, a circuit connected between said clutch relay and the source of electric power and including a plurality of pairs of switches with each member of the pair connected in parallel with the other member, said pairs being connected in series with each other and with said clutch relay, the first switch in each pair being normally open and manually closable and the second switch in each pair being selectively positioned in either open or closed position, a third switch for each pair of switches connected in series with said pairs of switches, said clutch relay and source of electric power, said third switch being linked to said second switch and moved to open position as but shortly before said second switch is closed and moved to closed position as but shortly after said second switch is opened, a normally open anti-repeat switch in series with said clutch relay and said pairs of switches, an anti-repeat relay connected to close said anti-repeat switch when energized, and a second circuit including a set of normally closed manually openable fourth switches linked to said first switches of each pair and connected in series with each other and with said anti-repeat relay and said source of power, each of said switches when moved to open position closing the corresponding first switch, thereby to break the manually controlled circuit to the anti-repeat relay and to close the circuit to the clutch relay.

7. A control as claimed in claim 6, including a holding circuit for said anti-repeat relay, said holding circuit including means to prevent deenergization of said anti-repeat relay when the press is to be operated on repeated cycles.

8. A control as claimed in claim 6, including a holding circuit for said anti-repeat relay, said holding circuit including means to prevent deenergization of said anti-repeat relay when the press is to be operated on repeated cycles, and manually openable switch means in said holding circuit to break said holding circuit and stop the press at the end of a cycle when the press is operating on repeated cycles.

9. A control for a press having a clutch and electrically operated means for controlling the clutch operation and adapted to be connected to a source of electric power, comprising in combination, normally open switch means controlling the supply of current to the electrically operated clutch controlling means, a clutch relay connected to close said switch means when energized, a circuit connected between said clutch relay and said source of electric power and including a plurality of series connected pairs of switches with each member of the pair being connected in parallel with the other member, the first switch in each pair being normally open and manually closable and the second switch in each pair being selectively positioned in either open or closed position, a third switch for each pair of switches connected in series in said circuit and being linked to said second switch and moved to open position as but shortly before said second switch is closed and moved to closed position as but shortly after said second switch is opened, a normally open anti-repeat switch in series with said clutch relay and said pairs of switches, an anti-repeat relay connected to close said anti-repeat switch when energized, and a second circuit including a set of normally open manually operable fourth switches linked to said first switches of each pair and connected in series with said anti-repeat relay and with said source of power, each of said fourth switches being movable in a first direction to energize said anti-repeat relay and in a second direction to open position and to close the corresponding first switch so long as manually held in first switch closing position.

10. A control for a press having a clutch and electrically operated means for controlling the clutch operation and adapted to be connected to a source of electric power, comprising in combination, normally open switch means controlling the supply of current to the electrically operated clutch controlling means, a clutch relay connected to close said switch means when energized, a circuit connected between said clutch relay and said source of electric power and including a plurality of series connected pairs of switches with each member of the pair being connected in parallel with the other member, the first switch in each pair being normally open and manually closable and the second switch in each pair being selectively positioned in either open or closed position, a third switch for each pair of switches connected in series in said circuit and being linked to said second switch and moved to open position as but shortly before said second switch is closed and moved to closed position as but shortly after said second switch is opened, a normally open anti-repeat switch connected in series with said clutch relay and said pairs of switches, an anti-repeat relay connected to close said anti-repeat switch when energized, a holding circuit for said anti-repeat relay, and a set of parallel connected normally open manually closable fourth switches in a circuit connecting said anti-repeat relay with said source of power, and a switch operator for both said normally open manually closable switches and being movable in a first direction to close one of said fourth switches thereby to energize said anti-repeat relay and to condition the circuit to said clutch relay, said operator thereafter being movable in a second direction to open said fourth switch and to close one of said first switches thereby to energize said clutch relay only so long as said operator is held manually moved in said second direction.

11. A control for a press having a clutch and electrically operated means for controlling the clutch operation and adapted to be connected to a source of electric power, comprising in combination, normally open switch means controlling the supply of current to the electrically operated clutch controlling means, a clutch relay connected to close said switch means when energized, a circuit between said clutch relay and said source of electric power and including an anti-repeat switch and normally open manually operable switch means, an anti-repeat relay, a circuit connecting said anti-repeat relay to the source of power and including a second normally open manually operable switch means, a holding circuit for said anti-repeat relay and a switch operator for both said normally open manually operable switch means and being movable in a first direction to close said second normally open manually operable switch means to energize said anti-repeat relay thereby to condition said circuit to said clutch relay for operation, said switch operator thereafter being movable in a second direction to close said first normally open manually operable switch means to energize said clutch relay.

12. A control for a press having a clutch and electrically operated means for controlling the clutch operation and adapted to be connected to a source of electric power, comprising in combination, normally open switch means controlling the supply of current to the electrically operated clutch controlling means, a clutch relay connected to close said switch means when energized, and a circuit for operating the clutch relay including a plurality of series connected pairs of switches with each member of the pair being connected in parallel with the other member, the first switch in each pair being normally open and manually closable and the second switch in each pair being selectively positioned in either open or closed position, and including a third switch for each pair of switches connected in series in said circuit and linked to said second switch and moved to open position as but shortly before said second switch is closed and moved to closed position as but shortly after said second switch is opened.

References Cited in the file of this patent
UNITED STATES PATENTS

| | | |
|---|---|---|
| 2,302,838 | Bundy | Nov. 24, 1942 |
| 2,680,368 | McKitrick | June 8, 1954 |
| 2,752,441 | Frank | June 26, 1956 |
| 2,778,891 | Jacobi | Jan. 22, 1957 |
| 2,848,087 | Simson et al. | Aug. 19, 1958 |
| 2,854,115 | Friedman | Sept. 30, 1958 |
| 2,915,651 | Samuels et al. | Dec. 1, 1959 |
| 2,959,263 | Simpson | Nov. 8, 1960 |